(12) United States Patent
Ohara

(10) Patent No.: US 9,347,173 B1
(45) Date of Patent: May 24, 2016

(54) METHOD OF MANUFACTURING A DAMPER FOR A LOUDSPEAKER

(71) Applicant: Hiroshi Ohara, Taoyuan County (TW)

(72) Inventor: Hiroshi Ohara, Taoyuan County (TW)

( * ) Notice: Subject to any disclaimer, the term of this patent is extended or adjusted under 35 U.S.C. 154(b) by 0 days.

(21) Appl. No.: 14/623,486

(22) Filed: Feb. 16, 2015

(51) Int. Cl.
| | |
|---|---|
| *G10K 11/16* | (2006.01) |
| *D06M 11/55* | (2006.01) |
| *H04R 9/04* | (2006.01) |
| *B29C 51/00* | (2006.01) |
| *B29C 51/02* | (2006.01) |
| *B29C 51/26* | (2006.01) |
| *D06M 13/432* | (2006.01) |
| *B29K 103/00* | (2006.01) |
| *B29K 105/08* | (2006.01) |
| *B29L 31/00* | (2006.01) |

(52) U.S. Cl.
CPC ............. *D06M 11/55* (2013.01); *B29C 51/004* (2013.01); *B29C 51/02* (2013.01); *B29C 51/266* (2013.01); *D06M 13/432* (2013.01); *H04R 9/043* (2013.01); *B29K 2103/00* (2013.01); *B29K 2105/0809* (2013.01); *B29K 2995/0002* (2013.01); *B29L 2031/721* (2013.01)

(58) Field of Classification Search
CPC ................... E04B 2001/8461; G10K 11/16
USPC ........................................................ 181/208
See application file for complete search history.

(56) References Cited

U.S. PATENT DOCUMENTS

| | | | |
|---|---|---|---|
| 6,772,855 B2 * | 8/2004 | Tomiyama et al. ........... | 181/172 |
| 7,311,174 B2 * | 12/2007 | Hayakawa et al. ........... | 181/169 |
| 7,344,001 B2 * | 3/2008 | Inoue et al. .................. | 181/169 |
| 2007/0177758 A1 * | 8/2007 | Ohara ........................... | 381/426 |
| 2011/0027534 A1 * | 2/2011 | Ogawa et al. ................. | 428/153 |

* cited by examiner

*Primary Examiner* — Forrest M Phillips
(74) *Attorney, Agent, or Firm* — Lin & Associates Intellectual Property, Inc.

(57) ABSTRACT

A method of manufacturing a damper of a loudspeaker includes the steps of: immersing a fiber cloth with a resinous solution containing resin and formaldehyde catching agent, wherein the resin comprises formaldehyde while the formaldehyde catching agent reduces the amount of formaldehyde in the resin; drying the immersed fiber cloth; forming the dried fiber cloth to a configuration similar to a shape of the damper; and cutting the dried fiber cloth along the shape of the damper, thereby obtaining the damper having low formaldehyde content.

9 Claims, 1 Drawing Sheet

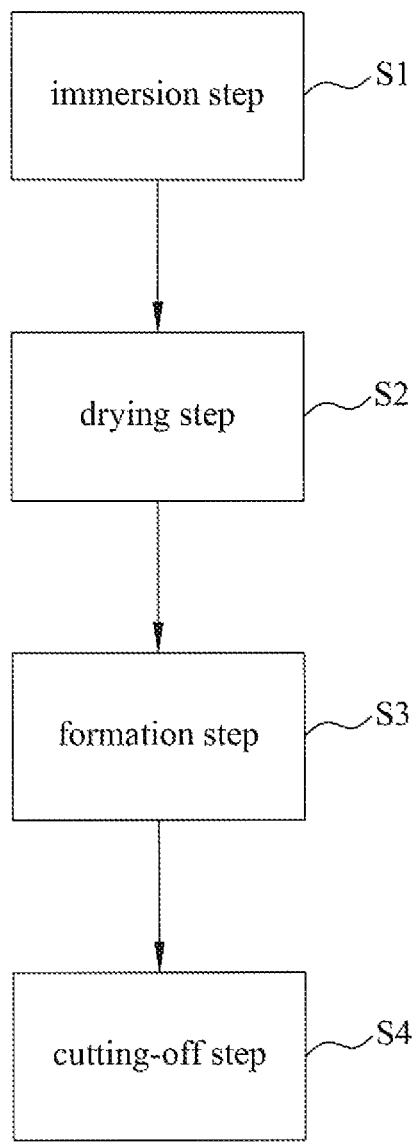

METHOD OF MANUFACTURING A DAMPER FOR A LOUDSPEAKER

BACKGROUND OF THE INVENTION

1. Field of the Invention

The present invention relates generally to a damper of a loudspeaker, and more particularly to a method of manufacturing a damper for a loudspeaker such that the damper manufactured accordingly has low formaldehyde content.

2. The Prior Arts

A damper is one component of the loudspeaker, also known as damping device or shock absorber or axis stabilizing plate. A conventional method of manufacturing a damper includes the steps of: immersing a piece of fiber cloth within a resinous solution; drying, formation and cutting-off processes, after which, a flexible damper is obtained.

However, it is noted that the resinous solution used for manufacturing of flexible damper contains highly toxic formaldehyde, which is classified as carcinogenic and teratogenic substances by World Health Organization (WHO). The toxic formaldehyde may cause some diseases to human health, namely dysosmia, irritation, allergy, pulmonary function abnormalities, liver dysfunction and immune dysfunction and so on. When the concentration of formaldehyde in the atmosphere reaches 0.06-0.07 mg/m$^3$, children may suffer from slight asthma. When the indoor air contains formaldehyde content of 0.1 mg/m$^3$, the smell is awful and one may feel discomfort and when it reaches 0.5 mg/m$^3$, it may irritate the eyes, causing tears; up to 0.6 mg/m$^3$ may cause throat discomfort or pain. At higher concentrations, the formaldehyde content can cause nausea, vomiting, cough, chest tightness, shortness of breath or pulmonary edema; and upon reaching 30 mg/m$^3$ may cause immediate death to nearby living persons. Long-term exposure to low doses of formaldehyde can cause chronic respiratory disease, nasopharyngeal cancer, colon cancer, brain tumor, menstrual disorders in women, gene mutations, within the DNA single-strand DNA cross-linking, cross-linking of DNA and proteins, inhibition of DNA damage repair, pregnancy complications, neonatal chromosomal abnormalities, leukemia, and decline in memory and adolescent mentality. In all of the people who are exposed to formaldehyde, children and pregnant women are particularly sensitive to formaldehyde since the latter is more harmful to them.

Therefore, it is highly desired to develop and provide a method of manufacturing a damper for a loudspeaker, having low formaldehyde content, so that the residual formaldehyde content of the resin can meet safety standards in various countries. Hence, the concerned people are focusing on the field of the manufacturing.

SUMMARY OF THE INVENTION

A primary objective of the present invention is to provide a method of manufacturing a damper for a loudspeaker such that the damper manufactured accordingly has low formaldehyde content, so that the residual formaldehyde content of the resin can meet safety standards in various countries.

Another objective of the present invention is to provide a damper for a loudspeaker such that the flexible damper has reduced formaldehyde content to meet the safety standards in various countries.

The method of manufacturing a damper for a loudspeaker of the present invention includes the following steps.

An immersion step, where a piece of fiber cloth is immersed within a resinous solution containing resin and formaldehyde catching agent in order to obtain an immersed fiber cloth, wherein the resin comprises formaldehyde while the formaldehyde catching agent reduces the amount of formaldehyde in the resin.

A drying step, where the immersed fiber cloth is dried.

A formation step, where the dried fiber cloth is formed to a configuration similar to a shape of the damper.

A cutting-off step, in which the dried fiber cloth is cut along the shape of semi-finished damper, thereby obtaining the damper having low formaldehyde content.

In order to achieve the preceding objectives, a flexible damper for a loudspeaker is manufactured according to the present invention such that the flexible damper has low formaldehyde content One specific feature of the present invention resides in that in the immersion step, the piece of fiber cloth is immersed in the resinous solution containing resin and formaldehyde catching agent which combines with the formaldehyde from the resin and produces after chemical reaction low toxic or non-toxic substances, thereby reducing formaldehyde content in the resin. Hence, the damper manufactured accordingly has low formaldehyde content, so that the residual formaldehyde content of the resin can meet safety standards in various countries.

BRIEF DESCRIPTION OF THE DRAWINGS

The present invention will be apparent to those skilled in the art by reading the following detailed description of a preferred embodiment thereof, with reference to the attached drawings, in which:

FIGURE is a block diagram illustrating a method of manufacturing a damper for a loudspeaker according to the present invention.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

FIGURE is a block diagram illustrating a method of manufacturing a damper for a loudspeaker according to the first embodiment of the present invention. The method includes the following steps:

An immersion step S1: a piece of fiber cloth is immersed within a resinous solution containing resin and formaldehyde catching agent in order to obtain an immersed fiber cloth, wherein the resin comprises formaldehyde while the formaldehyde catching agent reduces the amount of formaldehyde in the resin. In this embodiment, the resinous solution containing resin is mixed with the formaldehyde catching agent to form an immersion solution, after which the piece of fiber cloth is immersed in the immersion solution. The immersion solution contains 12% of the resinous solution containing resin and 1.2% of the formaldehyde catching agent, which in fact, is a metal salt. Preferably, the resin is ethylene urea resin while the metal salt is sulfates or sulfites. Sulfates or sulfites (chemical formula $M_2SO_X$) and formaldehyde (chemical formula $CH_2O$) which chemical reaction equation is as follows:

$$M_2SO_X + CH_2O + H_2O \rightarrow HOCH_2SO_XM + MOH$$

wherein, M is a metal of monovalence or other metal of non monovalent state, X=2 or 3. From the foregoing, it is noted that the sulfates or sulfites and formaldehyde in the resin after reaction produce a non-toxic substance $HOCH_2SO_xM$, thereby reducing formaldehyde content in the resin. In other embodiments, the piece of fiber cloth is immersed firstly in the resinous solution containing resin, and then the piece of fiber cloth is immersed secondly in the formaldehyde catching agent and vice versa. Alternately, it is also feasible that the piece of fiber cloth is immersed totally in the resinous solution containing resin, and then the formaldehyde catching agent is sprayed and coated over the piece of fiber cloth.

A drying step S2: the excess of resin from the piece of immersed fiber cloth is squeezed out by placing the latter in a rotating drum and then the immersed fiber cloth containing resin is dried for 7 minutes at a temperature of 80° C.

A formation step S3: the dried fiber cloth is formed to a configuration similar to a shape of the damper. In this embodiment, the dried resin-containing fiber cloth is heat-pressed for 6 minutes at temperature of 150° C. to form the final shape of the flexible damper.

A cutting-off step S4: the dried fiber cloth is cut along the shape of the semi-finished damper, thereby obtaining the flexible damper having low formaldehyde content.

Finally, an iodometric titration is conducted on the above-mentioned flexible damper of the present invention to find out the low residual formaldehyde content of the resin ranges 0% to 0.5% in the flexible damper.

Refer to FIGURE again, which illustrates a method of manufacturing a damper for a loudspeaker according to the second embodiment of the present invention. The method includes the following steps:

An immersion step S1: a piece of fiber cloth is immersed within a resinous solution containing resin and formaldehyde catching agent in order to obtain an immersed fiber cloth, wherein the resin comprises formaldehyde while the formaldehyde catching agent reduces the amount of formaldehyde in the resin. In this embodiment, the resin is mixed with the formaldehyde catching agent to form an immersion solution, after which the piece of fiber cloth is immersed in the immersion solution. The immersion solution contains 15% of the resinous solution containing resin and 1.5% of the formaldehyde catching agent, which in fact, is an amine (of formula $R—NH_2$). The chemical reaction equation between the amine and the formaldehyde is as follows:

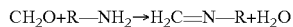

It is noted the chemical reaction between the amine and the formaldehyde in the resin produces a non-toxic substance $H_2C=N—R$ and water, thereby reducing the formaldehyde content in the resin. Preferably, the amine is urea (chemical formula $(NH_2)_2CO$), urea and formaldehyde chemical reaction equation is as follows:

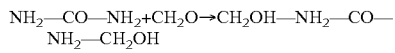

From above, it is noted that the chemical reaction between urea and formaldehyde resin produces a non-toxic substance $CH_2OH—NH_2—CO—NH_2—CH_2OH$, thereby reducing the formaldehyde content in the resin. Preferably, the resin consists of uronic resin, denatured urea resin and highly condensed urea resins. In this embodiment, the immersion solution contains 10% of the uronic resin, 3% of the denatured urea resin, 2% of the highly condensed urea resin and 1.5% of urea.

A drying step S2: the excess of resin from the immersed fiber cloth is squeezed out by placing the latter in a rotating drum and then the immersed fiber cloth containing resin is dried for 5 minutes at a temperature of 80° C.

A formation step S3: the dried fiber cloth is formed to a configuration similar to a shape of the damper. In this embodiment, the dried resin-containing fiber cloth is heat-pressed for 5 minutes at temperature of 140° C. to form the final shape of the flexible damper.

A cutting-off step S4: the dried fiber cloth is cut along the shape of the semi-finished damper, thereby obtaining the flexible damper having low formaldehyde content.

Finally, phloroglucinol color reaction is used to test the flexible damper obtained accordingly above to find out the low residual formaldehyde content of the resin is as low as 0.04%.

It is noted that in the immersion step of the present invention, the fiber cloth is immersed in the resinous solution containing resin and formaldehyde catching agent, where the formaldehyde catching agent reacts together with the formaldehyde in the resin to produce low toxic or non-toxic substances, thereby reducing the formaldehyde content in the resin. In this way, the flexible damper manufactured according to the method of the present invention has low residual formaldehyde content so as to meet the safety standards in various countries. Since the installation of low volatility organic damper of the present invention also meet environmental demands, and reduce the risk exposure of the loudspeakers under the user's environment in formaldehyde, which in turn, allows the users to be healthier physically and mentally.

It is also noted that in the immersion step of the present invention, the resinous solution containing resin and the formaldehyde catching agent are firstly mixed to form the immersion solution before the fiber cloth is immersed therein such that the reaction has begun between the formaldehyde catching agent and the formaldehyde in the resin a long time earlier to produce low toxicity or non-toxic substances. In other words, the fiber cloth is immersed in the immersion solution when the formaldehyde content of the resin of the immersion solution has been reduced a lot. In addition, before beginning the drying step, the residual formaldehyde content of the resin in the fiber cloth has reached within a safe range as regulated in various countries.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for manufacturing a damper for a loudspeaker, comprising the steps of:
   an immersion step: immersing a piece of fiber cloth within a resinous solution containing resin and formaldehyde catching agent in order to obtain an immersed fiber cloth, wherein the resin comprises formaldehyde while the formaldehyde catching agent reduces the amount of formaldehyde in the resin;
   a drying step: drying the immersed fiber cloth containing the resin for a period of time under a temperature of about 80° C.;
   a formation step: forming the dried fiber cloth containing the resin to a configuration similar to a shape of the damper, wherein in the formation step, the dried fiber cloth containing the resin is heat-pressed with a temperature higher than the temperature in the drying step; and
   a cutting-off step: cutting the dried fiber cloth along the shape of the damper, thereby obtaining the damper having low formaldehyde content.

2. The method according to claim 1, wherein in the immersion step, the resinous solution containing resin and formaldehyde catching agent are mixed together thoroughly in order to form an immersion solution prior to immersing the piece of fiber cloth in the immersion solution.

3. The method according to claim 2, wherein the immersion solution contains 12% of the resinous solution containing resin and 1.2% of the formaldehyde catching agent, which is a metal salt.

4. The method according to claim 3, wherein said metal salt is either sulfates or sulfites.

5. The method according to claim 3, wherein in the drying step, the fiber cloth is dried for 7 minutes under 80° C. and in the formation step, the dried fiber cloth containing the resin is heat-pressed for 6 minutes under 150° C. so that the fiber cloth has a damper configuration.

6. The method according to claim 2, wherein the solution contains 15% of the resinous solution containing resin and 1.5% of the formaldehyde catching agent, which is an amine.

7. The method according to claim 6, wherein said amine is urea.

8. The method according to claim 6, wherein in the drying step, the fiber cloth containing the resin is dried for 5 minutes under 80° C. and in the formation step, the dried fiber cloth is heat-pressed for 5 minutes under 140° C. so that the fiber cloth has a damper configuration.

9. A damper for a loudspeaker, having low formaldehyde content and fabricated according to the method of claim 1.

* * * * *